Jan. 31, 1933.  J. M. J. DORMOY  1,895,451
BRAKE MECHANISM
Filed April 17, 1930   2 Sheets-Sheet 1

INVENTOR
JULES MARIE JOSEPH DORMOY
BY  *Wm. M. Cady*
ATTORNEY.

Jan. 31, 1933.　　　J. M. J. DORMOY　　　1,895,451
BRAKE MECHANISM
Filed April 17, 1930　　2 Sheets-Sheet 2

INVENTOR.
JULES MARIE JOSEPH DORMOY
BY Wm. M. Cady
ATTORNEY.

Patented Jan. 31, 1933

1,895,451

UNITED STATES PATENT OFFICE

JULES MARIE JOSEPH DORMOY, OF PARIS, FRANCE, ASSIGNOR TO THE WESTINGHOUSE AIR BRAKE COMPANY, OF WILMERDING, PENNSYLVANIA, A CORPORATION OF PENNSYLVANIA

BRAKE MECHANISM

Application filed April 17, 1930, Serial No. 444,944, and in France May 14, 1929.

This invention relates to brake controlling mechanism and more particularly to that type known as "servo-brake" mechanism wherein the manual effort exerted by the operator is supplemented by an auxiliary power exerting means.

The principal object of my invention is to provide an improved "servo-brake" mechanism which is simple in construction and efficient in operation and which may be used in conjunction with a transmission shaft, a fly wheel or any other suitable part of any mechanism in which the speed of a moving part is to be decelerated.

Another object of my invention is to provide an improved "servo-brake" mechanism wherein manual effort exerted by the operator, in effecting the control of the brakes, will be augmented by a portion of the kinetic energy of a moving mass being decelerated.

A further object of my invention is to provide an improved "servo-brake" mechanism in which a portion of the kinetic energy of a moving mass which is utilized to supplement the effort exerted by an operator in effecting the control of the brakes, is proportional to the energy exerted by the operator.

A still further object of my invention is to provide an improved "servo-brake" mechanism having friction elements adapted to cooperate to utilize a portion of the kinetic energy of a moving mass in augmenting the manual effort exerted by an operator in effecting the control of the brakes and to embody in the brake mechanism, means adapted to automatically control the operation of the friction elements in such a manner that the braking power, for a given force exerted on the foot pedal, will remain substantially constant, regardless of any increase in the coefficient of friction between the friction elements, thus insuring the smooth and regular deceleration of the moving mass.

Other objects and advantages will appear in the following more detailed description of the invention.

Figure 1:
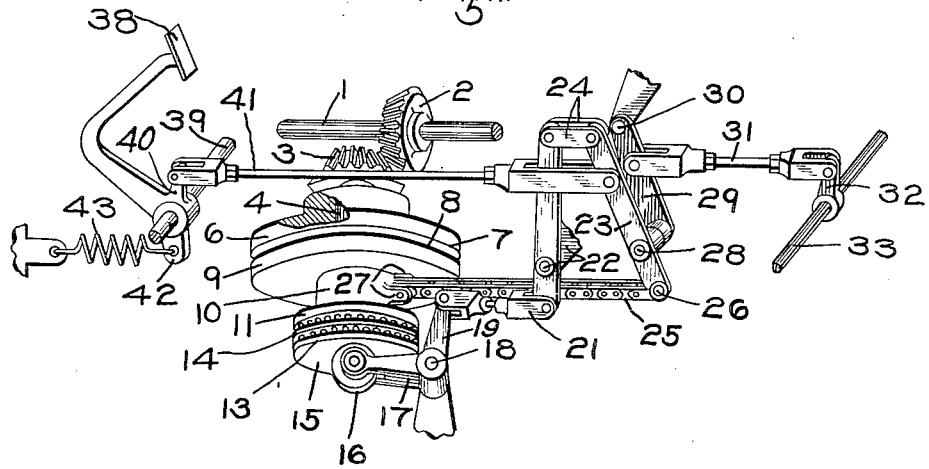
Figure 2:
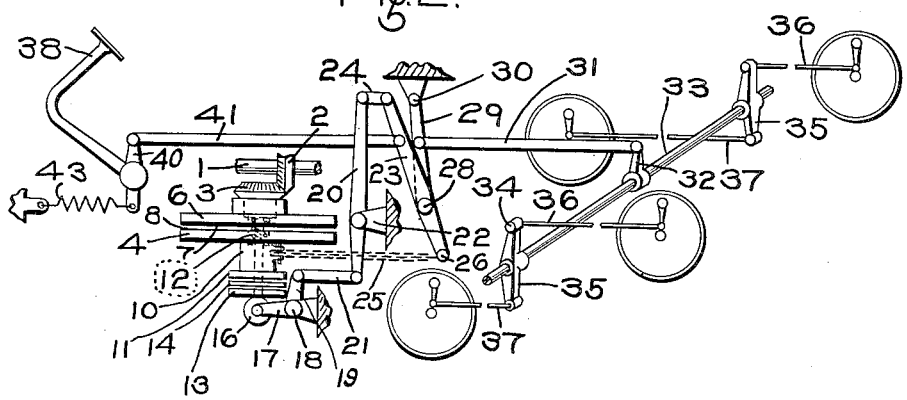
Figure 4:
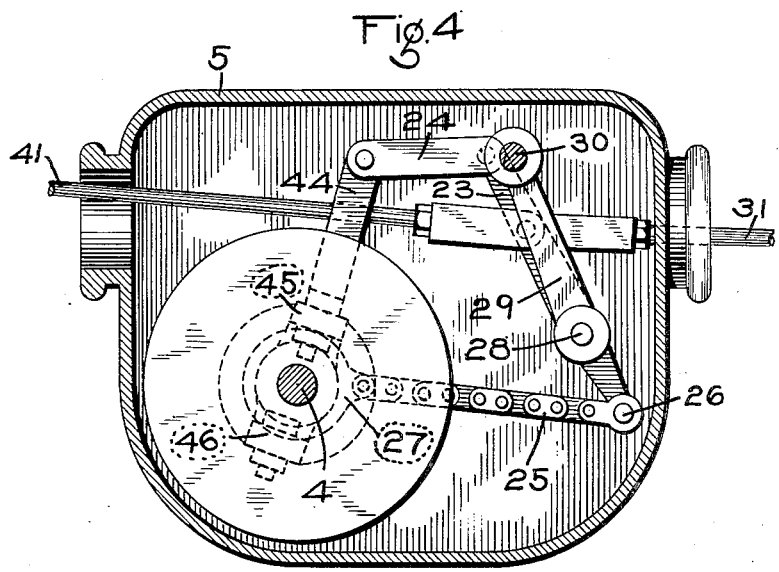
Figure 3:
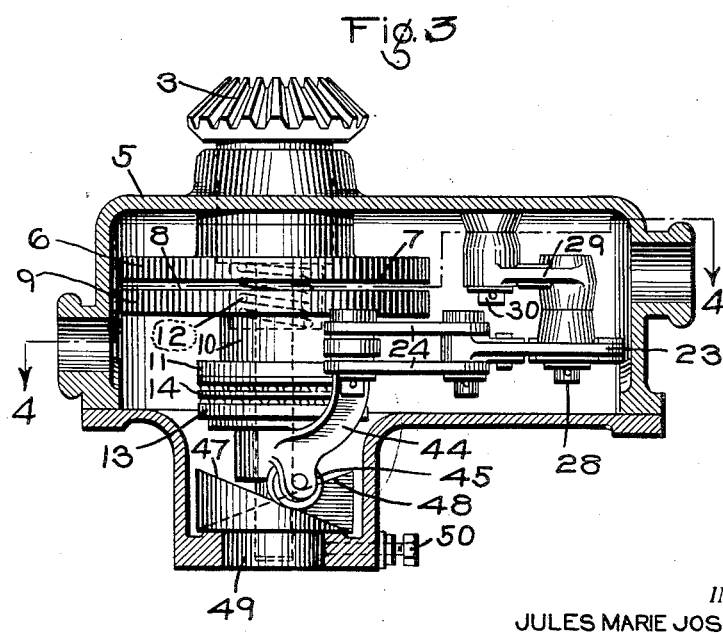

In the accompanying drawings; Fig. 1 is an isometric view of a brake mechanism embodying my invention, the casing for the mechanism being omitted for the purpose of illustrating the invention more clearly; Fig. 2 is a diagrammatic view of the same; Fig. 3 is a side elevational view of a modified form of the invention, the casing in which the major portion of the mechanism is mounted being shown in section; and Fig. 4 is a sectional view of the same taken on the line 4—4 of Fig. 3.

In the drawings, I have illustrated my improved brake mechanism applied to an automotive vehicle, but it will be understood that I contemplate its use in other types of vehicles as well as in mechanism where the speed of moving parts is to be decelerated.

Referring now in detail to the drawings, the reference character 1 indicates the usual driving shaft of an automotive vehicle to which is secured a beveled gear wheel 2, the teeth of which constantly mesh with the corresponding teeth of a gear wheel 3 secured to a rotatable shaft 4 suitably journalled in a casing 5 rigidly fixed to the vehicle frame or in any other desired fixed part of the vehicle.

Fixed to this shaft 4 is a plate 6 having a flat friction surface 7, which is adapted to be frictionally engaged by a corresponding flat friction surface 8 of a flange 9, preferably integral with one end of a winding drum 10 rotatably and slidably mounted on the shaft. At the other end of the drum 10 and preferably integral therewith is a flange 11.

Interposed between the plate 6 and the flange 9 of the drum 10 and surrounding the shaft 4, is a spring 12, the pressure of which maintains the flange 9 out of frictional engagement with the plate 6 when the brakes are released.

Also slidably mounted on the shaft 4 is a thrust plate 13, and interposed between and engaging this plate and the outer surface of the flange 11 is an anti-friction thrust bearing 14.

The outer surface 15 of the thrust plate 13 is engaged by a roller 16 carried by the arm 17 of a bell crank which is fulcrumed at 18 to a fixed part of the vehicle frame. The arm 19 of this bell crank is operatively connected to one end of a lever 20 through the medium of a rod 21, said lever being fulcrumed, intermediate its ends, to a fixed part 22 of the vehicle frame. The other end of this lever 20 is operatively connected to the adjacent end of a lever 23 through the medium of spaced links 24, the other end of the lever 23 having one end of a flexible element, such as a chain 25, operatively connected thereto by a pin 26. The other end of this chain is anchored to spaced lugs 27 projecting from the drum 10.

Intermediate its ends, the lever 23 is pivotally connected, through the medium of a pin 28, to one end of a lever 29, the opposite end of the lever 29 being fulcrumed at 30 to a fixed part of the vehicle frame.

The lever 29, intermediate its ends, is operatively connected, through the medium of a rod 31, to an arm 32 fixed to a transversely extending rock shaft 33, which may be journalled in any desired manner in fixed parts of the vehicle frame. Fixed to the rock shaft adjacent each end are arms 34 and 35. Each of the arms 34 is adapted to actuate the usual brake elements associated with the rear wheels of the vehicle through the medium of a rod 36, and each of the arms 35 is adapted to actuate the usual brake elements associated with the front wheels through the medium of a rod 37. This portion of the mechanism has not been fully illustrated, since the specific details of the braking elements form no part of the invention.

For the purpose of controlling the brakes, a foot pedal 38 is provided which is pivotally mounted on a rod 39 mounted on the vehicle frame in any desired manner. This pedal is provided with an arm 40 which is operatively connected, through the medium of a rod 41, to the lever 23 intermediate the pin 28 and the links 24. The pedal is also provided with an arm 42 to which one end of a brake releasing spring 43 is anchored, the other end of the spring being anchored to a fixed part of the vehicle frame. Instead of anchoring the release spring to the pedal it may, if desired, be anchored to any other suitable part of the mechanism.

When the vehicle is in motion, the drive shaft rotates, and through the medium of the beveled gears 2 and 3 and the shaft 4 causes the plate 6 to rotate.

Assuming the vehicle to be in motion and the several parts of the mechanism to be in their release positions as shown in Figs. 1 and 2, and it is desired to effect an application of the brakes, the operator forces the foot pedal 38 forward, and the force developed thereby is transmitted to the lever 23, causing said lever to rotate in an anti-clockwise direction about the pin 26, which is maintained stationary by the chain 25. Movement of the lever in this direction causes the lever 29 to rotate about the fulcrum 30 in a clockwise direction which, in turn, through the medium of the rod 31, causes the arm 32 and rock shaft 33 to rotate in an anti-clockwise direction, thus actuating the arms 34 and 35 and rods 36 and 37 to transmit braking power to the braking elements associated with the wheels of the vehicle.

As the lever 23 is thus being rotated about the pin 26, it will, through the medium of the links 24, cause the lever 20 to rotate in an anti-clockwise direction about its fulcrum 22, causing the bell crank to rotate in a clockwise direction about its fulcrum 18. When the bell crank is thus rotated, the arm 17 thereof, through the medium of the roller 16, exerts pressure on the thrust plate 13, causing the drum 10 to be moved toward the driven plate 6 against the opposing pressure of the spring 12.

Now when the friction surface 8 of the flange 9 of the drum is moved into frictional engagement with the friction surface of the rotating plate 6, rotary movement is imparted to the drum 10, which tends to wind the chain 25 on the drum, thus applying power to the lever 23 through the medium of the chain 25 and pin 26. Power thus applied to the lever 23 is transmitted through the pin 28 to one end of the lever 29, causing the lever 29 to rotate about its fulcrum 30 in a clockwise direction, thus applying additional braking power to the rod 31. As the levers 23 and 29 are thus operating, the pin 28 acts as a fulcrum for the lever 23 about which the lever 23 tends to rotate in an anti-clockwise direction, so that power is transmitted through the links 24 to one end of the lever 20, which tends to rotate the lever 20 in a clockwise direction about its fulcrum 22, and since the other end of the lever 20 is operatively connected to the bell crank, the pressure exerted on the thrust plate 13 by the bell crank will be decreased, thus decreasing the frictional resistance between the plate 6 and the flange 9 of the drum 10. When this action takes place, the rotation of the drum will cease, so that no further braking power is applied through this medium unless the operator exerts additional effort on the foot pedal 38.

It will be noted that the force applied to the lever 23, through the medium of the chain 25 and pin 26 not only acts to augment the braking power but also produces a reaction against the force exerted through the medium of the pedal 38, so that the braking power, for a given pedal pressure, will remain substantially constant regardless of any increase in the coefficient of friction between the friction surfaces 7 and 8 of the plate 6 and flange 9 respectively.

From the foregoing description, it will be understood that if the distance between the pins 28 and 26 is increased, the amplification of the braking power is decreased, and if the distance is decreased, the amplification is decreased.

To release the brakes, the operator removes his foot from the foot pedal 38 and when he does this the several rods and levers of the mechanism will return to their release positions as shown in Figs. 1 and 2, thus relieving the drum 10 of pressure and permitting it to move to its normal release position out of frictional engagement with the plate 6.

In Figs. 3 and 4 a modified form of the invention is illustrated, which differs from the form illustrated in Figs. 1 and 2 only in the mechanism for controlling the movement of the drum 10. In this modification, the lever 20 is omitted and a lever 44 substituted therefor, which lever 44 adjacent its lower end is slidably mounted on the shaft 4, and is adapted to engage the thrust plate 13. This end of the lever carries rollers 45 and 46, which are oppositely disposed diametrically of the shaft 4, and which constantly engage the oppositely inclined surfaces 47 and 48 of a member 49 mounted in the casing.

It will be evident that when the operator depresses the pedal 38 to effect an application of the brakes, the lever 44 is rotated about the shaft 4, causing the rollers and inclined surfaces to cooperate to move the lever longitudinally of the shaft 4 away from the member 49. The lever in turn causes the drum 10 to move in the same direction into frictional engagement with the plate 6.

The member 49 may be rotated relative to the casing 5, so as to regulate the space between the friction surfaces 7 and 8, and may be held in its adjusted position by a bolt 50, having screw-threaded connection with the casing.

In the foregoing description, the foot pedal has been described as the means through which power is applied to control the brakes, but it will be apparent that any other means under the control of the operator may be substituted.

While two illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a brake mechanism, the combination with a friction clutch comprising a driven friction element and a normally stationary friction element, of a brake, a lever controlled manually for initially effecting an application of the brake, lever means operated by said lever for pressing said stationary friction element into frictional engagement with said driven friction element, and a connection from said stationary friction element to said lever for transmitting power from said stationary friction element as imparted thereto by said driven friction plate to said lever to augment the braking power applied manually, said lever means being operative by said lever upon the application of power thereto through said connection for relieving some of the pressure on said stationary friction element.

2. In a brake mechanism, the combination with a brake, of a lever fulcrumed at one end for transmitting braking power to said brake, a lever pivotally connected intermediate its ends to the other end of the first mentioned lever and operative to transmit power to the first mentioned lever, a foot pedal operative to apply power to the second mentioned lever to effect an initial application of the brakes, a driven element, and means operative upon the application of manual power to the second mentioned lever for transmitting power from said driven element to the second mentioned lever for augmenting the braking power applied manually, said means being subject to a portion of the power applied to the second mentioned lever for limiting the power transmitted from said driven element.

3. In a brake mechanism, the combination with a brake, of a lever fulcrumed at one end for transmitting braking power to said brake, a lever pivotally connected intermediate its ends to the other end of the first mentioned lever and operative to transmit power to the first mentioned lever, a foot pedal operative to apply power to the second mentioned lever to effect an initial application of the brakes, a driven element, and means operative upon the application of manual power to the second mentioned lever for transmitting power from said driven element to the second mentioned lever for augmenting the braking power applied manually, said means being subject to a portion of the power applied to the second mentioned lever for varying the power transmitted from said driven element according to the power applied manually through said foot pedal.

4. In a brake mechanism, the combination with a brake, of a lever fulcrumed at one end for transmitting braking power to said brake, a lever pivotally connected intermediate its ends to the other end of the first mentioned lever, manually controlled means for applying power to the second mentioned lever to effect an initial application of the brakes, a driven element, and means operative by the second mentioned lever for transmitting power from said driven member to the second mentioned lever to augment the braking power applied through said manually controlled means.

5. In a brake mechanism, the combination with a brake, of a lever fulcrumed at one end for transmitting braking power to said brake, a lever pivotally connected intermediate its ends to the other end of the first mentioned lever, manually controlled means for applying power to the second mentioned lever to effect an initial application of the brakes, a driven element, and means operative by the second mentioned lever for transmitting power from said driven member to the second mentioned lever at a point below its connection with the first mentioned lever to augment the braking power applied through said manually controlled means and to limit the power applied to the second mentioned lever according to the power applied through said manually controlled means.

In testimony whereof I have hereunto set my hand, at Wilmerding, Pennsylvania, United States of America, this 14th day of April, 1930.

JULES MARIE JOSEPH DORMOY.